(12) United States Patent
Waggle et al.

(10) Patent No.: US 9,475,131 B2
(45) Date of Patent: Oct. 25, 2016

(54) MILLING CUTTER WITH STRESS RELIEFS

(71) Applicant: Kennametal Inc., Latrobe, PA (US)

(72) Inventors: James Michael Waggle, Derry, PA (US); Ronald Louis Dudzinsky, Derry, PA (US)

(73) Assignee: KENNAMETAL INC., Latrobe, PA (US)

( * ) Notice: Subject to any disclaimer, the term of this patent is extended or adjusted under 35 U.S.C. 154(b) by 541 days.

(21) Appl. No.: 13/916,909

(22) Filed: Jun. 13, 2013

(65) Prior Publication Data

US 2014/0369773 A1    Dec. 18, 2014

(51) Int. Cl.
*B23C 5/22*   (2006.01)
*B23C 5/10*   (2006.01)
*B23C 5/00*   (2006.01)

(52) U.S. Cl.
CPC ............... *B23C 5/003* (2013.01); *B23C 5/109* (2013.01); *B23C 5/2208* (2013.01); *B23C 5/006* (2013.01); *B23C 2200/165* (2013.01); *B23C 2210/168* (2013.01); *Y10T 407/1948* (2015.01)

(58) Field of Classification Search
CPC .................. Y10T 407/1948; Y10T 407/1936; Y10T 407/1934; B23C 2210/168; B23C 5/2208; B23C 5/109; B23C 5/003; B23C 5/006; B23C 5/2221; B23C 5/202; B23C 2200/164; B23C 2200/165
USPC .................................................. 407/101–105
See application file for complete search history.

(56) References Cited

U.S. PATENT DOCUMENTS

| 3,059,316 | A | * | 10/1962 | Berry, Jr. | B23B 27/16 407/101 |
| 3,442,342 | A |   | 5/1969  | Cunningham et al. | |
| 4,086,973 | A |   | 5/1978  | Keller et al. | |
| 4,527,930 | A | * | 7/1985  | Harroun | B23C 5/1045 407/42 |
| 4,648,760 | A | * | 3/1987  | Karlsson | B23B 27/141 407/113 |
| 4,812,087 | A |   | 3/1989  | Stashko | |
| 5,232,317 | A | * | 8/1993  | Peuterbaugh | B23C 3/00 407/107 |
| 6,004,081 | A | * | 12/1999 | Hellstrom | B23C 5/2221 407/101 |

(Continued)

FOREIGN PATENT DOCUMENTS

CN    101462184 A    6/2009

OTHER PUBLICATIONS

Chatelain, Jean F. et al., "A Comparison of Special Helical Cutter Geometries Based on Cutting Forces for the Trimming of CFRP Laminates", International Journal of Mechanics, Dec. 31, 2012.

*Primary Examiner* — Sara Addisu
(74) *Attorney, Agent, or Firm* — Larry R. Meenan

(57) ABSTRACT

A cutting tool, such as a milling cutter, includes a tool body and a plurality of pockets for receiving cutting inserts. Each pocket includes a bottom support surface, an radial support surface, an axial support surface, a first corner relief between the bottom support surface and the radial support surface, and a first stress relief formed in the first corner relief at one end of the pocket. The first stress relief is formed at an angle with respect to a plane parallel to the radial support surface. The first stress relief reduces a tensile stress of the cutting tool during a machining operation. A second and third stress relief may be formed in the first corner relief and/or in a second corner relief.

19 Claims, 5 Drawing Sheets

(56) References Cited

U.S. PATENT DOCUMENTS

| | | | | |
|---|---|---|---|---|
| 6,152,658 | A * | 11/2000 | Satran | B23B 27/00 407/103 |
| 6,196,769 | B1 * | 3/2001 | Satran | B23B 51/00 407/40 |
| 6,527,069 | B1 | 3/2003 | Meiners et al. | |
| 6,607,333 | B2 * | 8/2003 | Satran | B23C 5/1036 407/33 |
| 6,974,280 | B2 * | 12/2005 | Satran | B23C 5/08 407/113 |
| 7,204,662 | B1 * | 4/2007 | Long, II | B23C 5/003 407/103 |
| 7,322,774 | B2 | 1/2008 | Volokh | |
| 7,832,966 | B2 | 11/2010 | Shultz et al. | |
| 7,896,106 | B2 | 3/2011 | Gavia | |
| 8,454,277 | B2 * | 6/2013 | Dudzinsky | B23C 5/006 407/103 |
| 8,647,026 | B2 * | 2/2014 | Filho | B23C 5/109 407/33 |
| 9,011,049 | B2 * | 4/2015 | Fang | B23C 5/2221 407/113 |
| 2004/0149493 | A1 | 8/2004 | McDonough | |
| 2006/0260439 | A1 * | 11/2006 | Tubinger | B23B 51/04 76/108.6 |
| 2007/0280790 | A1 * | 12/2007 | Kovac | B23B 27/1662 407/30 |
| 2008/0179106 | A1 | 7/2008 | Gavia et al. | |
| 2009/0107200 | A1 | 4/2009 | Luo | |
| 2009/0169313 | A1 * | 7/2009 | Satran | B23C 5/109 407/40 |
| 2010/0104384 | A1 * | 4/2010 | Orlov | B23C 5/109 407/41 |
| 2010/0124465 | A1 * | 5/2010 | Morrison | B23C 5/1045 407/42 |
| 2011/0076106 | A1 * | 3/2011 | Morrison | B23C 5/1045 407/102 |
| 2011/0293381 | A1 * | 12/2011 | Saji | B23C 5/109 407/40 |
| 2012/0070238 | A1 * | 3/2012 | Men | B23C 5/1045 407/42 |
| 2014/0086696 | A1 * | 3/2014 | Fang | B23C 5/2221 407/99 |
| 2014/0205387 | A1 * | 7/2014 | Norstedt | B23C 5/2208 407/35 |
| 2015/0139743 | A1 * | 5/2015 | Ballas | B23C 5/109 407/48 |
| 2015/0375310 | A1 * | 12/2015 | Dufour | B23C 5/1027 407/40 |

* cited by examiner

MILLING CUTTER WITH STRESS RELIEFS

BACKGROUND OF THE INVENTION

Cutting tools, such as milling cutters, are rotatable tools of cylindrical, conical, shaped or disk form, having a plurality of cutting edges. Such cutters are available in many forms, such as plain cylindrical, side milling cutters, face and end mills, formed cutters, and standard and special shaped profile cutters.

End mills employing cutting inserts mounted at the front end of the tool are known in the art. The end mills can be used in several types of applications depending on the configuration of the cutting inserts mounted therein. The cutting inserts may present a peripheral cutting edge for side milling, a front cutting edge for face milling and a curved cutting edge of a so-called "ball-nose" end mill for various copying applications. Four flute mills are probably the most common, but 2, 3 or 6 flutes are also used extensively. End mills are in much used because they can execute a wide variety of milling operations, and the initial cost of the cutter is moderate. Shapes other than cylindrical are also in common use. The shank can be parallel or tapered, and need not necessarily be equal to the cutter teeth diameter.

Usually when an end mill is in operation, the machining force is exerted against one edge of the cutter. The resulting moment is resisted by the tool holder which rigidly grips the cutter shank. Ignoring the fact that the direction of the moment changes continually as the cutter revolves, the cutter can be considered to be stressed as a cantilever.

While the matter of stress discussed above is related to avoiding fatigue that would result in tool breakage, no less important is the requirement to minimize tool deflection, in order to improve accuracy and surface finish and to reduce vibration and noise. The bending moment, along with the rotation of the cutter, produces a fully reversed stress condition (alternating tensile and compressive stresses), which is the most devastating condition for fatigue.

Accordingly, there is a need for an improved cutting tool that can overcome the limitations of the known cutting tool, and reduce or eliminate the overall stress of the cutting tool.

SUMMARY OF THE INVENTION

The inventors of the invention has solved the problem of high stress associated with conventional cutting tools by providing a pocket feature located proximate the area of high stress on the radial support surface that greatly reduces the tensile stress, thereby improving tool safety and lifetime of the tool.

In one aspect, a cutting tool comprises a tool body including a plurality of pockets for receiving cutting inserts, each pocket comprising a bottom support surface, a radial support surface, a first corner relief between the bottom support surface and the axial support surface, and a first stress relief formed in the first corner relief at one end of the pocket, the first stress relief formed at an angle with respect to a plane parallel to the axial support surface, wherein the first stress relief reduces a tensile stress of the cutting tool during a machining operation.

In another aspect, a cutting tool comprises a tool body including a plurality of pockets for receiving cutting inserts, each pocket comprising a bottom support surface, an axial support surface, a radial support surface, a first corner relief between the bottom support surface and the axial support surface, a second corner relief between the bottom support surface and the radial support surface, a first stress relief formed in the first corner relief at one end of the pocket, the first stress relief formed at an angle with respect to a plane parallel to the axial support surface, and a second stress relief formed in the second corner relief, the second stress relief formed at an angle with respect to a plane parallel to the radial support surface, wherein the first and second stress reliefs reduce a tensile stress of the cutting tool during a machining operation.

In yet another aspect, a cutting tool comprises a tool body including a plurality of pockets for receiving cutting inserts, each pocket comprising a bottom support surface, an axial support surface, a radial support surface, a first corner relief between the bottom support surface and the axial support surface, a first stress relief formed in the first corner relief at one end of the pocket, the first stress relief formed at an angle with respect to a plane parallel to the axial support surface, and a third stress relief formed in the first corner relief at an opposite end of the pocket, the third stress relief formed at an angle with respect to the plane parallel to the axial support surface, wherein the first and third stress reliefs reduce a tensile stress of the cutting tool during a machining operation.

BRIEF DESCRIPTION OF THE DRAWINGS

While various embodiments of the invention are illustrated, the particular embodiments shown should not be construed to limit the claims. It is anticipated that various changes and modifications may be made without departing from the scope of this invention.

DETAILED DESCRIPTION OF THE INVENTION

Figure 1:
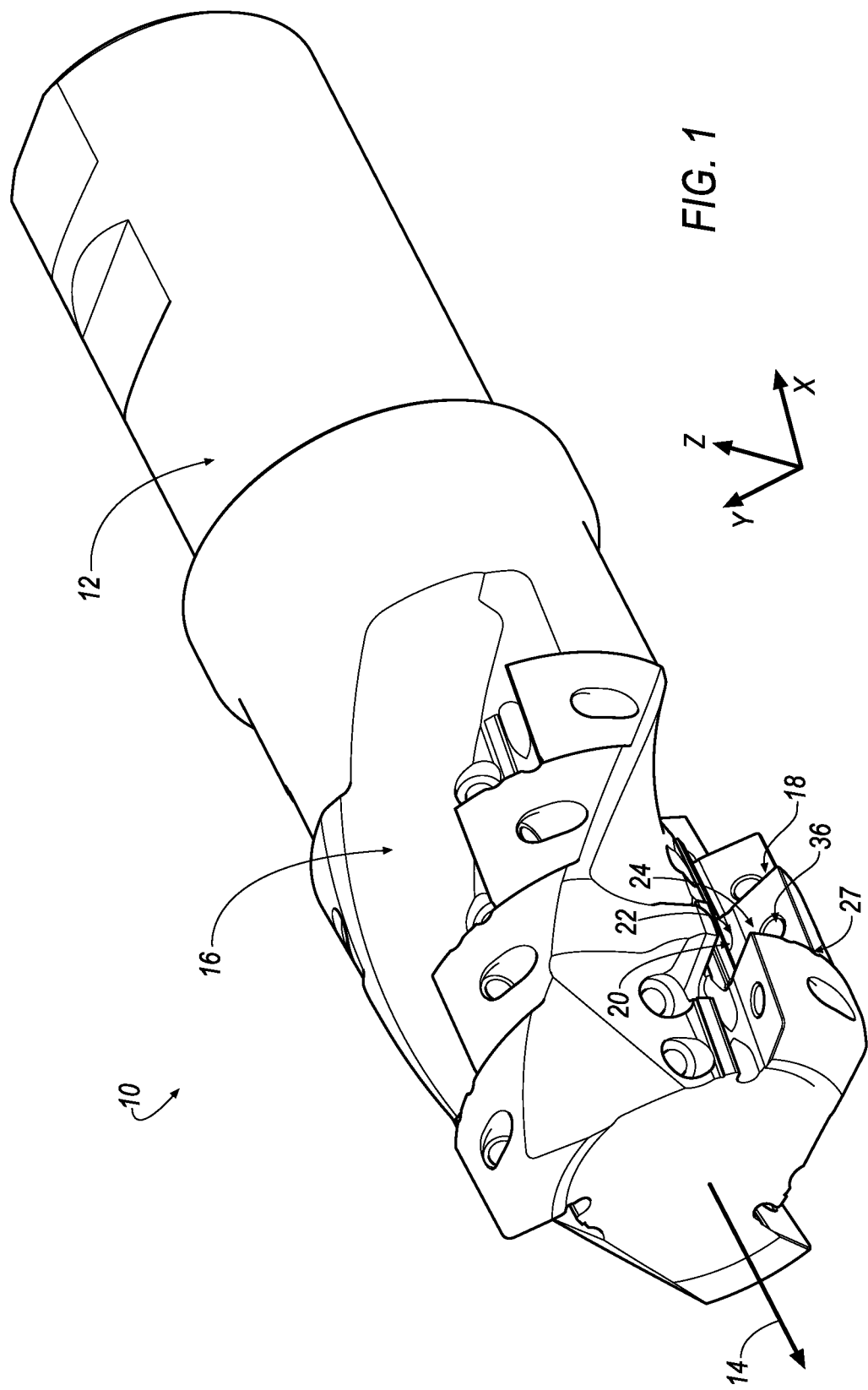
FIG. 1 is an isometric view of a cutting tool according to an embodiment of the invention.

Referring to the drawings, wherein like reference characters represent like elements, a cutting tool 10, generally shown in FIG. 1, includes a generally cylindrical tool body 12 that is generally radially symmetrical about its central, rotational axis 14 and terminates at a front end 15. In the illustrated embodiment, the cutting tool 10 comprises a milling cutter.

The tool body 12 preferably, but not necessarily, includes a plurality of flutes 16 each bearing a plurality of pockets 18 therein. The pockets 18 are rotationally symmetrically arranged with respect to the axis 14. At least one, but possibly more, of the cutting inserts (not shown) are configured and dimensioned to be received within and secured to each pocket 18. It will be appreciated that the invention is not limited by the number of pockets 18, and that the invention can be practiced with any desired number of pockets 18, depending on the dimensions of the tool body 12.

Figure 2:
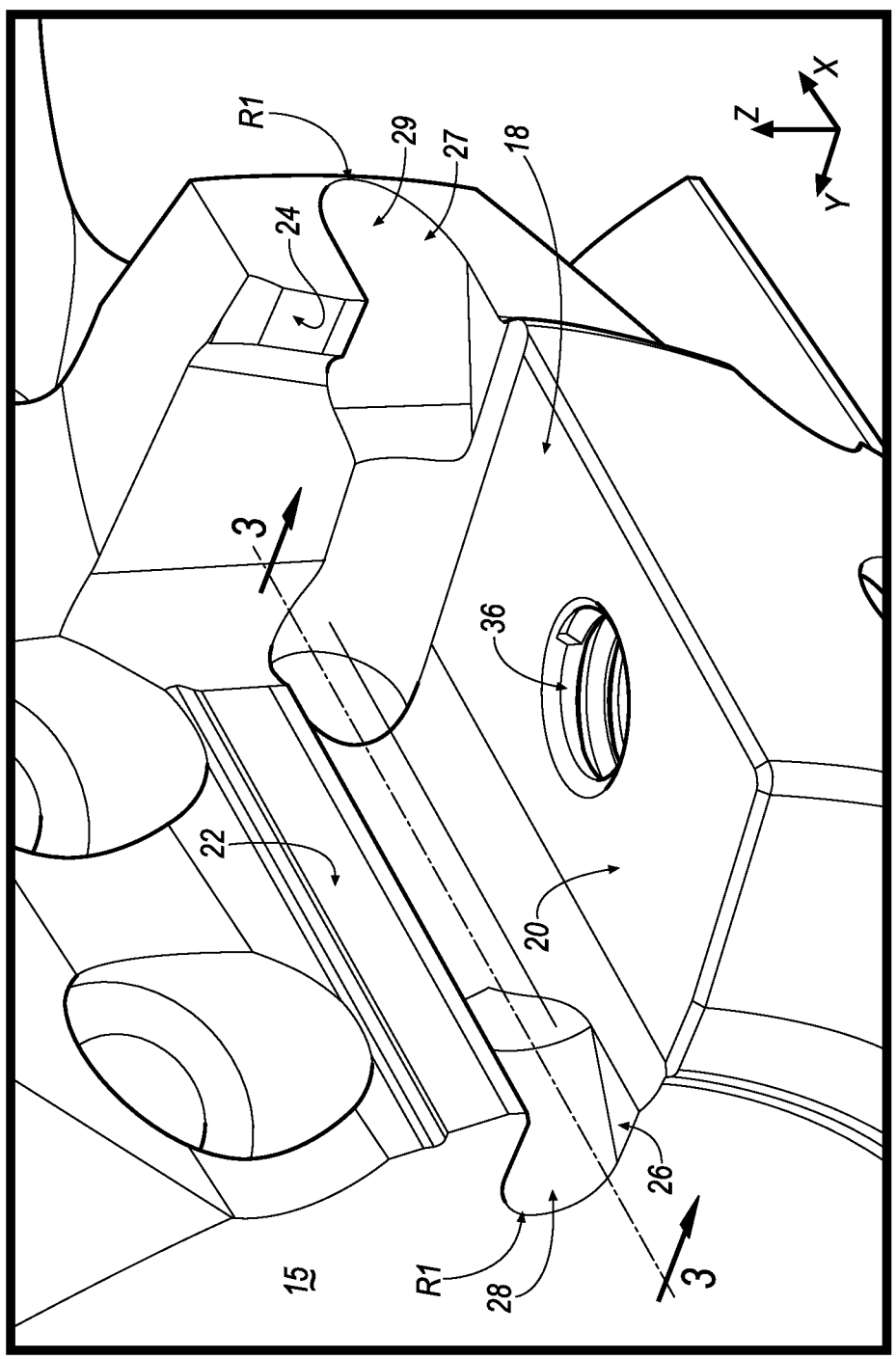
FIG. 2 is an enlarged view of the pocket of the cutting tool of FIG. 1 showing first and second stress reliefs for reducing stress according to an embodiment of the invention.
Figure 3:
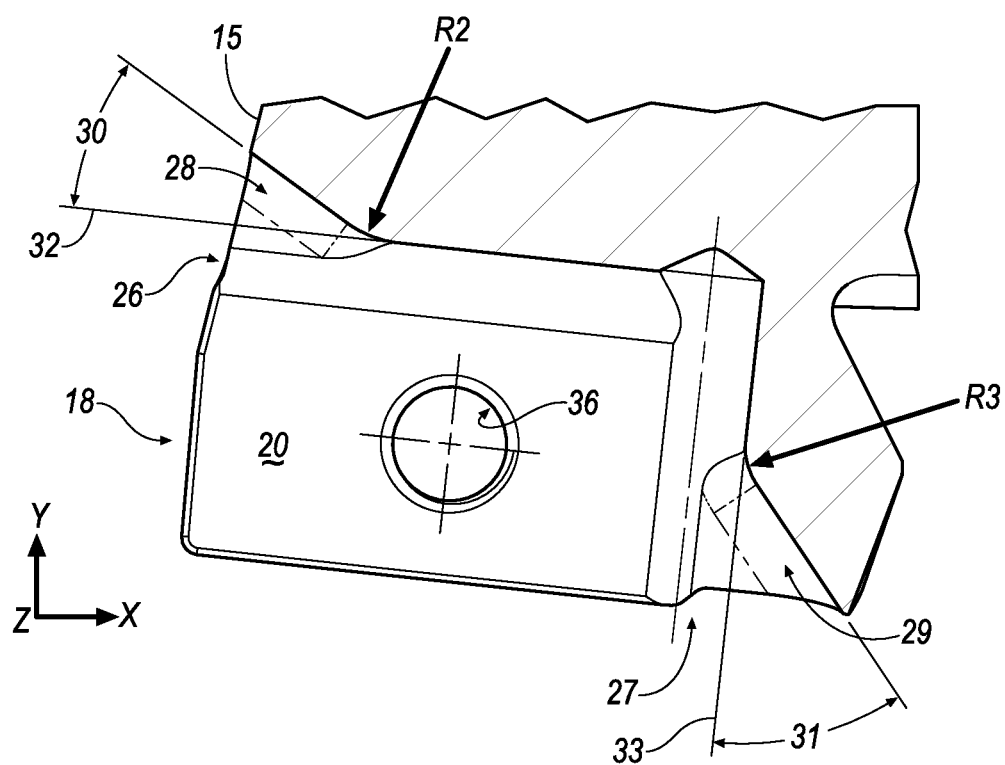
FIG. 3 is cross-sectional view of the pocket taken along line 3-3 of FIG. 2.

Referring now to FIGS. 2 and 3, each pocket 18 has a bottom support surface 20 that may be at an angle (not shown) with respect to the axis 14. The pocket 18 also includes a radial support surface 22 and an optional axial support surface 24 that constitute radial and axial abutment surfaces, respectively, for the side walls of the insert when mounted in the pocket 18. A first corner relief 26 is formed between the bottom support surface 20 and the radial support surface 22. In addition, a second corner relief 27 is formed between the bottom support surface 20 and the optional axial support surface 24 if the optional axial support surface 24 is provided in the cutting tool 10. A threaded bore 36 extends through the center of the bottom support surface 20 and is substantially perpendicular thereto. In the assembled position of the cutting tool 10, each of the cutting inserts is retained within a pocket 18 by a clamping screw (not shown) that passes through a through bore of the cutting insert and threadingly engages the threaded bore 36 in the pocket 18.

Referring now to FIG. 3, one aspect of the invention is that each corner relief 26, 27 is formed with a stress relief that reduces the tensile stress on the pocket 18, thereby increasing tool life. Specifically, a first stress relief 28 is formed in the first corner relief 26, and a second stress relief 29 is formed in the second corner relief 27. That is, the first stress relief 28 is formed between the bottom support surface 20 and the radial support surface 22, and the second stress relief 29 is formed between the bottom support surface 20 and the axial support surface 24.

The first stress relief 28 is a rounded body intersection having a substantially circular in cross-sectional shape and is formed at an angle 30 with respect to a plane 32 that is parallel to the radial support surface 22. The angle 30 can be in a range between about zero (0) degrees and about ninety (90) degrees. That is, the angle 30 is greater than zero (0) degrees, but less than ninety (90) degrees.

As shown in FIG. 2, the first stress relief 28 is formed with a radius, R1, at the intersection with the front end 15 of the tool body 12. The radius, R1, can be in a range between about 1 mm to about 3 mm. For example, the radius, R1, can be about 0.047 inches (approximately 1.19 mm). It will be appreciated that the invention is not limited by the magnitude of the radius, R1, of the first stress relief 28, and the magnitude of the radius, R1, of the first stress relief 28 depends on the design of the cutting insert, and other factors. In addition, the first stress relief 28 is also formed with a radius, R2, at the intersection with first corner relief 26, as shown in FIG. 3. The radius, R2, can be in a range between about 1 mm to about 20 mm.

Similarly, the second stress relief 29 is a rounded body intersection having a substantially circular in cross-sectional shape and is formed at an angle 31 with respect to a plane 33 that is parallel to the axial support surface 24. The angle 31 can be in a range between about zero (0) degrees and about ninety (90) degrees. That is, the angle 31 is greater than zero (0) degrees, but less than ninety (90) degrees.

Similar to the first stress relief 28, the second stress relief 29 is formed with the radius, R1, at the intersection with the outer periphery of the tool body 12. In addition, the second stress relief 29 is formed with a radius, R3, at the intersection with the second corner relief 27. The radius, R3, can be in a range between about 1 mm to about 20 mm. The angle 31 of the second stress relief 29 can be the same or different that the angle 30 of the first stress relief 28. In addition, the radius, R3, of the second stress relief 29 can be the same or different than the radius, R2, of the first stress relief 28.

It has been discovered that the first stress relief 28 formed in the first corner relief 26, and a second stress relief 29 formed in the second corner relief 27 produces the unexpected result of significantly reducing the tensile stress of the pocket 18 of the cutting tool 10, thereby extending tool life. Specifically, a finite element analysis (FEA) of the tensile stress of a conventional first row pocket of the cutting tool without the stress reliefs 28, 29 of the invention produced a maximum tensile stress of about 124,210 psi at the corner relief 26 and a maximum tensile stress of about 157,990 psi at the corner relief 27.

By contrast, a finite element analysis of the tensile stress of a first row pocket 18 of the cutting tool 10 with the stress reliefs 28, 29 of the invention produced a maximum tensile stress of about 81,905 psi at the stress relief 28 and a maximum tensile stress of about 71,344 psi at the stress relief 29. In other words, the stress reliefs 28, 29 reduced the maximum tensile stress at the corner relief 26 by about 34% and at the corner relief 27 by about 55%, which is a significant reduction of tensile stress.

A similar finite element analysis of the second and remaining rows of pockets of the cutting tool produces about a 20% reduction in the maximum tensile stress of the corner relief 27 and about a 27% reduction in the maximum tensile stress of the corner relief 26 as compared to a conventional pocket without the stress reliefs 28, 29.

Figure 4:
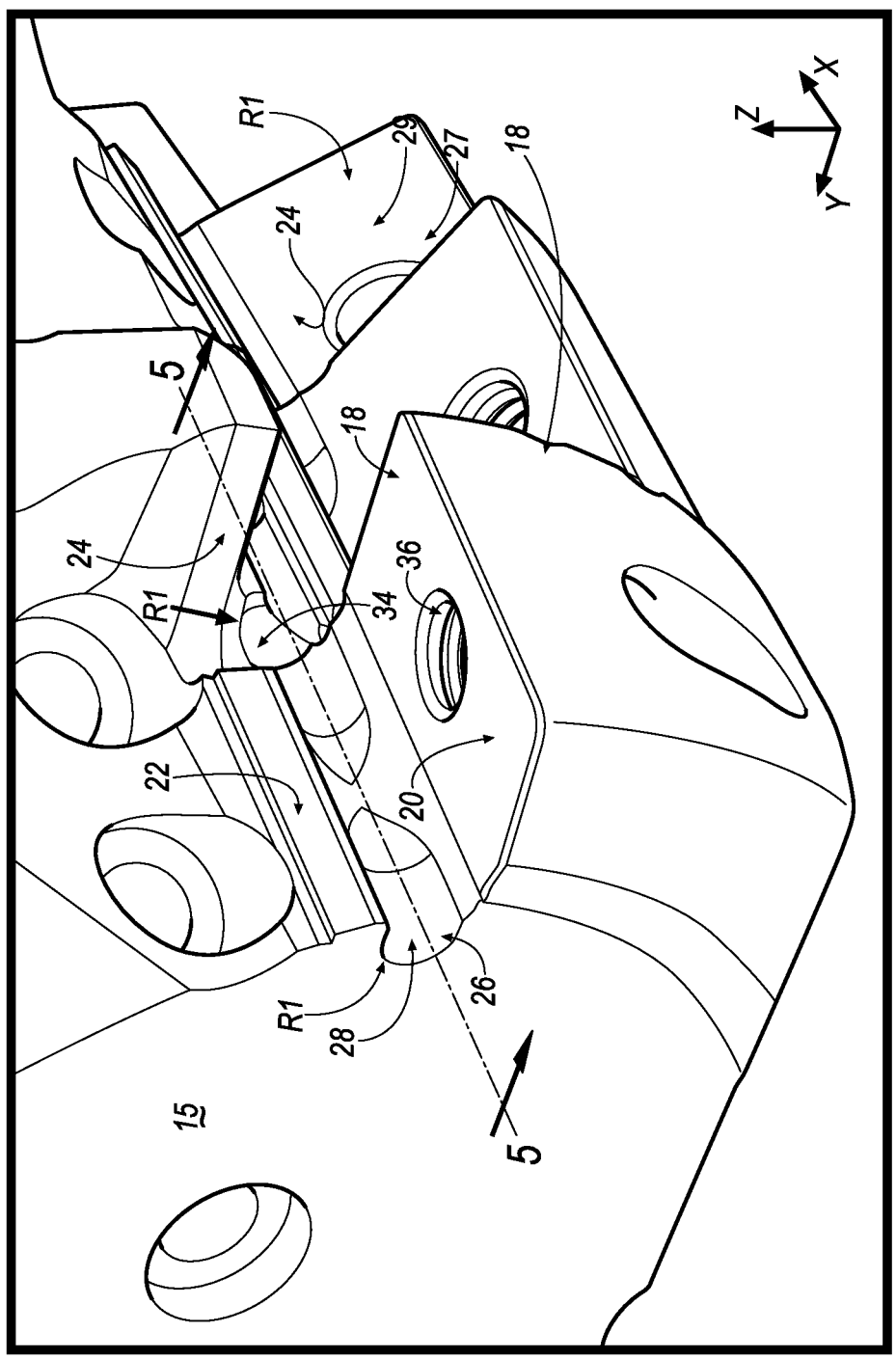
FIG. 4 is an enlarged view of the pocket of the cutting tool of FIG. 1 showing first and third stress reliefs for reducing stress according to an another embodiment of the invention.
Figure 5:
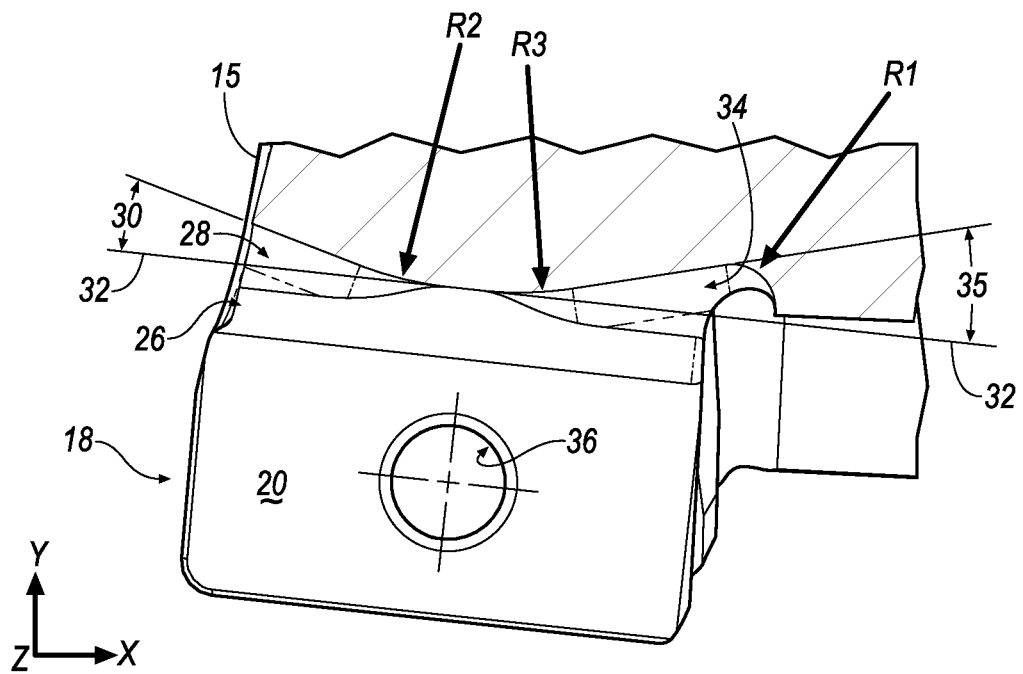
FIG. 5 is cross-sectional view of the pocket taken along line 5-5 of FIG. 4.

Referring now to FIGS. 4 and 5, the pocket 18 with stress reliefs is shown according to another embodiment of the invention. In this embodiment, the first stress relief 28 is formed in the corner relief 26 at one end of the pocket 18 between the bottom support surface 20 and the radial support surface 22. In addition, a third stress relief 34 is formed at the opposite end of the corner relief 26 between the bottom support surface 20 and the radial support surface 22 at an opposite end of the pocket 18.

As mentioned above, the first stress relief 28 is a rounded body intersection having a substantially circular in cross-sectional shape and is formed at the angle 30 with respect to the plane 32 that is parallel to the radial support surface 22. The angle 30 can be in a range between about zero (0) degrees and about ninety (90) degrees. That is, the angle 30 is greater than zero (0) degrees, but less than ninety (90) degrees. The first stress relief 28 is also formed with the radius, R2, at the intersection with the first corner relief 26.

Similarly, the third stress relief 34 is a rounded body intersection having a substantially circular in cross-sectional shape and is formed at an angle 35 with respect to the plane 32 that is parallel to the radial support surface 22. The angle 35 can be in a range between about zero (0) degrees and about ninety (90) degrees. That is, the angle 35 is greater than zero (0) degrees, but less than ninety (90) degrees. Similar to the first stress relief 28, the third stress relief 34 is formed with a radius, R3, at the intersection with the first corner relief 26. The radius, R3, can be in a range between about 1 mm to about 20 mm. The angle 35 of the third stress relief 34 can be the same or different that the angle 30 of the first stress relief 28. In addition, the radius, R3, of the third stress relief 34 can be the same or different than the radius, R2, of the first stress relief 28.

It will be appreciated that the invention can be practiced with the first and third stress reliefs 28, 34 formed in the first corner relief 26 and the second stress relief 29 formed in the second corner relief 27, or any combination thereof.

As described above, the stress reliefs 28, 29, 34 produce the unexpected result of greatly reducing the tensile stress of the cutting tool 10, thereby greatly increasing tool life as compared to conventional tools that do not include the stress reliefs of the invention.

The patents and other documents identified herein are hereby incorporated by reference herein. Other embodiments of the invention will be apparent to those skilled in the art from a consideration of the specification or a practice of the invention disclosed herein. It is intended that the specification and examples are illustrative only and are not intended to be limiting on the scope of the invention. The true scope and spirit of the invention is indicated by the following claims.

What is claimed is:

1. A cutting tool comprising:
a tool body including a plurality of pockets for receiving cutting inserts, each pocket comprising a bottom support surface, a radial support surface, an axial support surface, a first corner relief between the bottom support surface and the radial support surface, a second corner relief between the bottom support surface and the axial support surface, and a first stress relief formed in the first corner relief at one end of the pocket, the first stress relief formed at an angle with respect to a plane parallel to the radial support surface,
wherein the first stress relief reduces a tensile stress of the cutting tool during a machining operation.

2. The cutting tool of claim 1, wherein the first stress relief is circular in cross-sectional shape.

3. The cutting tool of claim 2, wherein the first stress relief is formed with a second radius, R2, at an intersection with the first corner relief.

4. The cutting tool of claim 2, wherein the first stress relief is formed with a first radius, R1, at an intersection with a front end of the tool body.

5. The cutting tool of claim 1, further comprising a second stress relief formed in the second corner relief, the second stress relief formed at an angle with respect to a plane parallel to the axial support surface.

6. The cutting tool of claim 5, wherein the second stress relief is circular in cross-sectional shape.

7. The cutting tool of claim 5, wherein the second stress relief is formed with a first radius, R1, at an intersection with an outer periphery of the tool body.

8. The cutting tool of claim 5, wherein the second stress relief is formed with a third radius, R3, at an intersection with the second corner relief.

9. The cutting tool of claim 1, further comprising a third stress relief formed in the first corner relief at an opposite end of the pocket, the third stress relief formed at an angle with respect to the plane parallel to the radial support surface.

10. The cutting tool of claim 9, wherein the third stress relief is circular in cross-sectional shape with a first radius R1.

11. The cutting tool of claim 9, wherein the third stress relief is formed with a third radius, R3, at an intersection with the first corner relief.

12. A cutting tool comprising:
a tool body including a plurality of pockets for receiving cutting inserts, each pocket comprising a bottom support surface, a radial support surface, an axial support surface, a first corner relief between the bottom support surface and the radial support surface, a second corner relief between the bottom support surface and the axial support surface, a first stress relief formed in the first corner relief at one end of the pocket, the first stress relief formed at an angle with respect to a plane parallel to the radial support surface, and a second stress relief formed in the second corner relief at another end of the pocket, the second stress relief formed at an angle with respect to a plane parallel to the axial support surface,
wherein the first and second stress reliefs reduce a tensile stress of the cutting tool during a machining operation.

13. The cutting tool of claim 12, wherein the first and second stress reliefs are circular in cross-sectional shape.

14. The cutting tool of claim 12, wherein the first stress relief is formed with a second radius, R2, at an intersection with the first corner relief, and wherein the second stress relief is formed with a third radius, R3, at an intersection with the first corner relief.

15. The cutting tool of claim 12, wherein the first stress relief is formed with a first radius R1, at an intersection with a front end of the tool body.

16. The cutting tool of claim 12, wherein the second stress relief is formed with a first radius R1, at an intersection with an outer periphery of the tool body.

17. A cutting tool comprising:
a tool body including a plurality of pockets for receiving cutting inserts, each pocket comprising a bottom support surface, a radial support surface, an axial support surface, a first corner relief between the bottom support surface and the radial support surface, a second corner relief between the bottom support surface and the axial support surface, a first stress relief formed in the first corner relief at one end of the pocket, the first stress relief formed at an angle with respect to a plane parallel to the radial support surface, and a third stress relief formed in the first corner relief at an opposite end of the pocket, the third stress relief formed at an angle with respect to the plane parallel to the radial support surface,
wherein the first and third stress reliefs reduce a tensile stress of the cutting tool during a machining operation.

18. The cutting tool of claim 17, wherein the first and third stress reliefs are circular in cross-sectional shape.

19. The cutting tool of claim 17, wherein the first stress relief is formed with a second radius, R2, at an intersection with the first corner relief, and wherein the third stress relief is formed with a third radius, R3, at an intersection with the first corner relief.

* * * * *